United States Patent
Gieras et al.

(10) Patent No.: US 9,458,844 B2
(45) Date of Patent: Oct. 4, 2016

(54) PROPELLER ROTOR AND ENGINE OVERSPEED CONTROL

(71) Applicant: Hamilton Sundstrand Corporation, Windsor Locks, CT (US)

(72) Inventors: Jacek F. Gieras, Glastonbury, CT (US); Lubomir A. Ribarov, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 704 days.

(21) Appl. No.: 13/924,050

(22) Filed: Jun. 21, 2013

(65) Prior Publication Data

US 2014/0377079 A1   Dec. 25, 2014

(51) Int. Cl.
| | |
|---|---|
| *F04B 35/04* | (2006.01) |
| *B64D 35/00* | (2006.01) |
| *H02K 49/04* | (2006.01) |
| *B60T 13/74* | (2006.01) |
| *F16D 63/00* | (2006.01) |

(52) U.S. Cl.
CPC ............. *F04B 35/04* (2013.01); *B60T 13/748* (2013.01); *B64D 35/00* (2013.01); *F16D 63/002* (2013.01); *H02K 49/043* (2013.01)

(58) Field of Classification Search
CPC ....... B64C 11/00; B64C 13/00; B64C 13/24; B64C 2013/00; B64C 2013/24; F16D 13/30; F16D 13/24; F16D 13/26; F16D 13/28; F16D 7/028
See application file for complete search history.

(56) References Cited

U.S. PATENT DOCUMENTS

| | | | |
|---|---|---|---|
| 726,536 A | 4/1903 | Holz | |
| 1,136,279 A | 4/1915 | Severy | |
| 1,306,784 A | 6/1919 | Soames et al. | |
| 2,221,014 A | 11/1940 | Williamson | |
| 2,241,242 A | 5/1941 | Friedman | |
| 2,452,820 A | 11/1948 | Winther | |
| 2,488,079 A | 11/1949 | DeLavaud et al. | |
| 2,519,449 A | 8/1950 | Findley | |
| 2,581,637 A | 1/1952 | Danly et al. | |
| 2,582,220 A * | 1/1952 | Beckwith | B60W 30/18 192/3.56 |
| 2,597,388 A | 5/1952 | DeLavaud | |
| 2,630,466 A * | 3/1953 | Landis | H02K 7/114 310/105 |
| 2,658,593 A | 11/1953 | Doebeli | |
| 2,661,148 A | 12/1953 | Englander | |

(Continued)

FOREIGN PATENT DOCUMENTS

GB          582411 A    11/1946

OTHER PUBLICATIONS

Extended European Search Report for EP Application Serial No. 14165359.2, dated Nov. 5, 2014, 5 pages.

*Primary Examiner* — Craig Kim
*Assistant Examiner* — Julian Getachew
(74) *Attorney, Agent, or Firm* — Kinney & Lange, P.A.

(57) ABSTRACT

An electromagnetic device for overspeed control of a propeller driven by an engine shaft comprises a clutch, an eddy-current coupler, and an electromagnetic brake. The clutch is disposed to mechanically decouple the propeller from the engine shaft. The eddy current coupler is disposed to electromagnetically couple the propeller to the engine shaft when the clutch mechanically decouples the propeller from the engine shaft. The electronic brake is disposed to artificially load the engine shaft when the propeller load on the engine shaft is reduced by mechanically decoupling the propeller from the engine shaft.

17 Claims, 3 Drawing Sheets

(56) References Cited

U.S. PATENT DOCUMENTS

| | | |
|---|---|---|
| 2,679,604 A | 5/1954 | Jaeschke |
| 2,732,921 A | 1/1956 | Rabinow |
| 2,902,612 A | 9/1959 | Whearley |
| 3,167,673 A | 1/1965 | Miquel et al. |
| 3,209,184 A | 9/1965 | Woodward, Jr. |
| 3,229,132 A | 1/1966 | Cohen et al. |
| 3,240,969 A | 3/1966 | Jaeschke |
| 3,353,641 A | 11/1967 | Chana |
| 3,382,384 A | 5/1968 | Hulls |
| 3,403,275 A | 9/1968 | Little |
| 3,450,910 A | 6/1969 | Jaeschke et al. |
| 3,478,239 A | 11/1969 | Jaeschke |
| 3,488,535 A | 1/1970 | Baermann |
| 3,488,536 A | 1/1970 | Baermann |
| 3,566,168 A | 2/1971 | Matsubara et al. |
| 3,601,641 A | 8/1971 | Baermann |
| 3,896,911 A | 7/1975 | Beneke |
| 3,974,408 A | 8/1976 | Fehr et al. |
| 4,094,393 A | 6/1978 | Spokas |
| 4,400,638 A | 8/1983 | Albrecht et al. |
| 4,446,391 A | 5/1984 | Sekine et al. |
| 4,488,627 A | 12/1984 | Streich et al. |
| 4,498,066 A | 2/1985 | Fujiwara et al. |
| 4,499,409 A | 2/1985 | Bauer |
| 4,526,257 A | 7/1985 | Mueller |
| 4,540,381 A | 9/1985 | Molloy et al. |
| 4,564,775 A | 1/1986 | Mazzorana |
| 4,576,266 A | 3/1986 | Schilling et al. |
| 4,696,378 A | 9/1987 | Brooks |
| 4,718,526 A | 1/1988 | Koitabashi |
| 4,926,992 A | 5/1990 | Linnig |
| 5,213,471 A | 5/1993 | Miller et al. |
| 5,238,095 A | 8/1993 | Pedu |
| 5,558,495 A | 9/1996 | Parker et al. |
| 5,611,415 A | 3/1997 | Davis et al. |
| 5,613,586 A | 3/1997 | Schilling et al. |
| 5,636,719 A | 6/1997 | Davis et al. |
| 5,994,810 A | 11/1999 | Davis et al. |
| 6,548,929 B2 | 4/2003 | Nelson et al. |
| 6,838,796 B1 | 1/2005 | Nelson |
| 7,343,744 B2 | 3/2008 | Abelson et al. |
| 7,535,684 B2 | 5/2009 | Ganev et al. |
| 7,598,646 B2 | 10/2009 | Cleveland |
| 7,643,928 B2 | 1/2010 | Soucy |
| 8,083,173 B2 | 12/2011 | Arlton et al. |
| 8,159,081 B2 | 4/2012 | Gainford et al. |
| 8,203,316 B2 | 6/2012 | Lemmers, Jr. |
| 8,701,381 B2 * | 4/2014 | Eames ............... B64C 11/346 60/39.163 |
| 2011/0286842 A1 | 11/2011 | Danielson et al. |

* cited by examiner

PROPELLER ROTOR AND ENGINE OVERSPEED CONTROL

BACKGROUND

The present invention relates generally to torque coupling devices, and more particularly to an electromechanical coupling assembly for avoidance and control of rotor overspeed conditions during propeller pitch control operation.

Engine overspeed is a major concern for turboprop engines, particularly during landing maneuvers. During landing, turboprop vehicles often control blade pitch to reverse the angle of attack of propeller blades. If blade pitch reversal is too gradual, propeller blades may be driven by airflow, rather than the reverse, transmitting harmful torque to the turboprop engine. This can erode the propeller blades, and can cause catastrophic damage to the turboprop engine. Most turboprop vehicles reverse blade pitch very quickly to avoid these conditions. Rapid propeller blade pitching poses its own challenges, however, as blades may be briefly unloaded when pitched edgewise into the wind while transitioning to a reverse pitch. This transient unloading of the propeller blades can cause harmful engine rotor overspeeds.

To avoid engine damage from engine shaft overspeeds, many turboprop systems spool engines down during propeller blade pitch reversal and rely on engine overspeed limiters that close fuel supply governor valves and shut down or reduce fuel to engine(s) if engine overspeed conditions are detected. Once spooled down, an engine requires significant time to spool back up. Consequently, the engine may be incapable of producing the required torque and propeller thrust to respond to an aborted landing command in time to regain altitude and avoid ground obstacles.

SUMMARY

The present invention is directed toward an electromagnetic device for overspeed control of an engine whose output shaft drives a propeller. The electromagnetic device comprises a clutch, an eddy-current coupler, and an electromagnetic brake. The clutch is disposed to mechanically decouple the propeller from the engine shaft. The eddy current coupler is disposed to electromagnetically couple the propeller to the engine shaft when the clutch mechanically decouples the propeller from the engine shaft. The electromagnetic brake is disposed to artificially load the engine shaft when the propeller load on the engine shaft is reduced by mechanically decoupling the propeller from the engine shaft.

DETAILED DESCRIPTION

Figure 1:
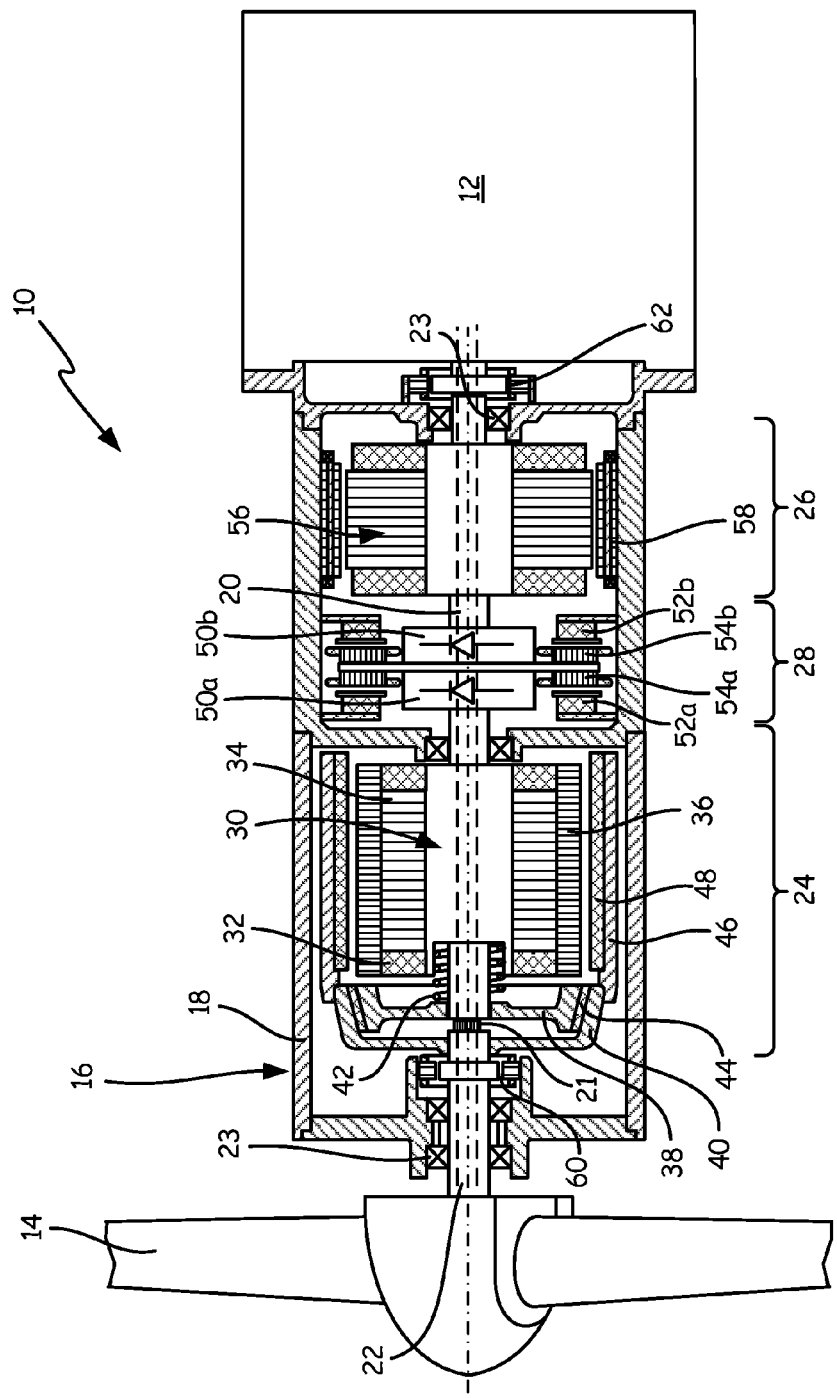
FIG. 1 is a simplified cross-sectional view of a propeller system that utilizes an electromagnetic (EM) device for overspeed control.

FIG. 1 is a simplified cross-sectional view of propeller system 10, comprising engine 12, propeller 14, and electromagnetic (EM) device 16. EM device 16 is a torque transfer apparatus that transmits torque from engine 12 to propeller 14. EM device 16 comprises housing 18, engine shaft 20, pitch control shaft 21, propeller shaft 22, bearings 23, electromechanical (ELM) clutch and eddy-current coupler 24, electromagnetic (EM) brake 26, and double-channel exciter 28. ELM clutch and eddy-current coupler 24 is a hybrid clutch machine comprising field exciter 30, field coils 32, pole cores 34, pole shoes 36, friction clutch cone 38, friction clutch cup 40, spring 42, clutch pad 44, rotating drum 46, and electric circuit 48. Double-channel exciter 28 is a dual-feed rotary electromagnetic exciter that feeds both integrated ELM clutch and eddy current coupler 24 and electromagnetic brake 26, and that comprises rotating rectifiers 50a and 50b, excitation windings 52a and 52b, and rotating armatures 54a and 54b. EM brake 26 is an artificial loading mechanism comprising rotating field exciter 56 and external electric circuit 58. EM device 16 further comprises permanent magnet (PM) tachogenerators 60 and 62, which produce feedback voltages $V_{fbP}$ and $V_{fbE}$ proportional to the speeds of propeller shaft 22 and engine shaft 20, respectively.

EM device 16 is a torque transfer system disposed to carry torque from engine 12 to propeller 14. Engine 12 may be any appropriate rotary engine, such as a gas turbine engine. Propeller 14 is a rotating assembly comprising a plurality of pitch-controlled blades extending substantially radially outward from a common hub. Propeller 14 may, for instance, be a propeller for propulsion of a turboprop aircraft. Engine 12 drives propeller 14 via EM device 16, which can mechanically decouple and electromagnetically couple engine shaft 20 and propeller shaft 22 as needed to avoid overspeed conditions, while artificially loading engine shaft 20 to compensate for decreases in load lost by decoupling engine shaft 20 from propeller shaft 22. Engine 12 drives engine shaft 20, while propeller shaft 22 drives propeller 14. In the illustrated embodiment, propeller shaft 22 and engine shaft 20 are hollows shafts concentrically disposed about pitch control shaft 21, a control shaft disposed to control the pitch of blade of propeller 14. In the illustrated embodiment, pitch control shaft 21 slides axially inside the engine shaft 20 and propeller shaft 22 to alter the pitch of blades of propeller 14. Engine 12 need not drive engine shaft 20 directly; many embodiments of propeller system 10 may utilize gearboxes or step-down gears to transfer torque from engine 12 to engine shaft 20.

EM device 16 is contained within housing 18, a rigid supportive and protective case that carries ELM clutch and eddy current coupler 24, EM brake 26, and double-channel exciter 28. Bearings 23 are disposed on housing 18 to rotatably support propeller shaft 22 and engine shaft 20. Bearings 23 may, for instance, be roller or ball bearings.

ELM clutch and eddy-current coupler 24 provides scalable torque coupling between propeller shaft 22 and engine shaft 20. Field exciter 30 of ELM clutch and eddy-current coupler 24 is a rotating cylindrical device with field coils 32, pole cores 34, and pole shoe 36. Field exciter 30 rotates on engine shaft 20. Field coils 32 are windings wrapped about pole cores 34 so as to produce a magnetic field near pole shoe 36 when energized by double-channel exciter 28. Pole cores 34 are radially-aligned supports distributed at circumferential intervals about field exciter 30, and may for instance be formed of steel or another ferromagnetic material. Some embodiments of field exciter 30 may, for example, have six substantially symmetrically distributed pole cores 34. Pole shoes 36 are ferromagnetic blocks disposed at the outer radial extents of pole cores 34 to face rotating drum 46 and electric circuit 48 (described below).

Engine shaft 20 terminates in friction clutch cone 38, and propeller shaft 22 terminates in friction clutch cup 40 of ELM clutch and eddy-current coupler 24. Friction clutch cone 38 is formed of steel or another rigid ferromagnetic material, while friction clutch cup 40 may be formed of any rigid material with appropriate torsional strength. Spring 42 biases friction clutch cone 38 to contact clutch pad 44, a friction pad disposed on an inner surface of friction clutch cup 40 facing friction clutch cone 38. In some embodiments, spring 42 may be replaced by a short-stroke linear electromagnetic actuator, or analogous device. So long as friction clutch cone 38 remains in contact with clutch pad 44 on friction clutch cup 40, propeller shaft 22 and engine shaft 20 remain rigidly mechanically coupled. This is the ordinary operation mode of ELM clutch and eddy-current coupler 24, connecting propeller shaft 22 to engine shaft 20 to transfer torque substantially losslessly from engine 12 to propeller 14. Rotating drum 46 is a cylindrical structure anchored to friction clutch cup 40 that surrounds field exciter 30. Rotating drum 46 supports electric circuit 48 (e.g. a cage winding, copper layer, or similar conductive structure), which opposes pole shoes 36 across a narrow air gap.

Field coils 32 of field exciter 30 can be energized to mechanically decouple friction clutch cone 38 from friction clutch cup 40, and electromagnetically couple field exciter 30 to rotating drum 46. When field coils 32 are energized by double-channel exciter 28, rotation of field exciter 30 induces eddy currents in electric circuit 48 proportional to the strength of the coupler energizing current $I_{eA}$ (see FIG. 2, described below). Magnetic attraction forces between friction clutch cone 38 and pole shoe 36 draw friction clutch cone 38 and attached clutch pad 44 away from friction clutch cup 40, thus severing the mechanical coupling between friction clutch cone 38 and friction clutch cup 40, and thereby between engine shaft 20 and propeller shaft 22. Eddy current coupling between pole shoes 36 and electric circuit 48 simultaneously carries torque from field exciter 30 to rotating drum 46, and thereby to propeller shaft 22, causing rotating drum 46, friction clutch cup 40, and propeller shaft 22 to rotate in the direction of engine shaft 20 despite the mechanical decoupling. The strength of electromagnetic torque coupling between rotating drum 46 and pole shoes 36 depends on the strength of the induced eddy currents, and therefore on the strength of coupler energizing current $I_{eA}$. In general, the rotational speed $v_p$ of propeller shaft 22 is related to the rotational speed $v_e$ of engine shaft 20 by slip s, such that:

$$v_p = (1-s)v_e \quad \text{[Equation 1]}$$

where s is substantially zero while friction clutch cone 38 is mechanically coupled to friction clutch cup 40, and where s decreases as $I_{eA}$ increases during electromagnetic coupling of field exciter 30 to rotating drum 46. Thus, the torque coupling between propeller shaft 22 and engine shaft 20 can be adjusted by varying $I_{eA}$.

EM brake 26 operates on similar principles to ELM clutch and eddy-current coupler 24. EM brake 26 comprises rotating field exciter 56, a substantially cylindrical structure with a plurality of coils wound on ferromagnetic cores supported on engine shaft 20. Rotating field exciter 56 is surrounded by external electric circuit 58 (e.g. a cage winding, copper layer, or similar structure), which is supported on housing 18. Rotation of rotating field exciter 56 induces eddy currents in external electric circuit 58 when rotating field exciter 56 is energized by brake energizing current $I_{eB}$ from double-channel exciter 28, much as discussed above with respect to field exciter 30 in the context of ELM clutch and eddy-current coupler 24. These eddy currents cause torque coupling between rotating field exciter 56 and external electric circuit 58, which is anchored to housing 18. Since housing 18 is a stationary structure, this torque coupling causes external electric circuit 58 to exert a braking torque on rotating field exciter 56 proportional to brake energizing current $I_{eB}$.

While engine shaft 20 is mechanically decoupled from propeller shaft 22 by ELM clutch and eddy-current coupler 24, increased speed $v_p$ results in decreasing load on drive shaft 20. To avoid engine overspeeds, electromagnetic brake 26 artificially loads engine shaft 20, thereby allowing engine 12 to operate at full power during pitch reversal (e.g. for landing maneuvers) of propeller 14 without risk of damaging overspeeds to engine 12.

Double-channel exciter 28 is a wound-field synchronous generator driven by engine shaft 20 that delivers coupler and brake energizing currents $I_{eA}$ and $I_{eB}$ to field exciter 30 and rotating field exciter 56, respectively. Double-channel exciter 28 comprises first and second rotating rectifiers 50a and 50b, first and second excitation windings 52a and 52b, and first and second rotating armatures 54a and 54b, respectively. Rotating rectifiers 50a and 50b are conventional rotating rectifiers. Excitation windings 52a and 52b are stationary windings anchored to casing 18 that are energized separately by DC control currents. Rotating armatures 54a and 54b are rotating structures comprising a plurality of wound ferromagnetic cores supported on engine shaft 20. AC voltage produced by the movement of windings on rotating armatures 54a and 54b are rectified by rotating rectifier 50a and 50b, respectively, and fed to ELM clutch and eddy-current coupler 24 and EM brake 26, respectively.

Tachogenerators 60 and 62 are permanent magnet or other generators disposed on propeller shaft 22 and engine shaft 20, respectively. Tachogenerators 60 and 62 generate small amplitude feedback signals proportional to the speed of propeller shaft 22 and engine shaft 20, respectively, that are used to produce the DC control currents of excitation windings 52a and 52b, as described below with respect to FIG. 2.

Figure 2:
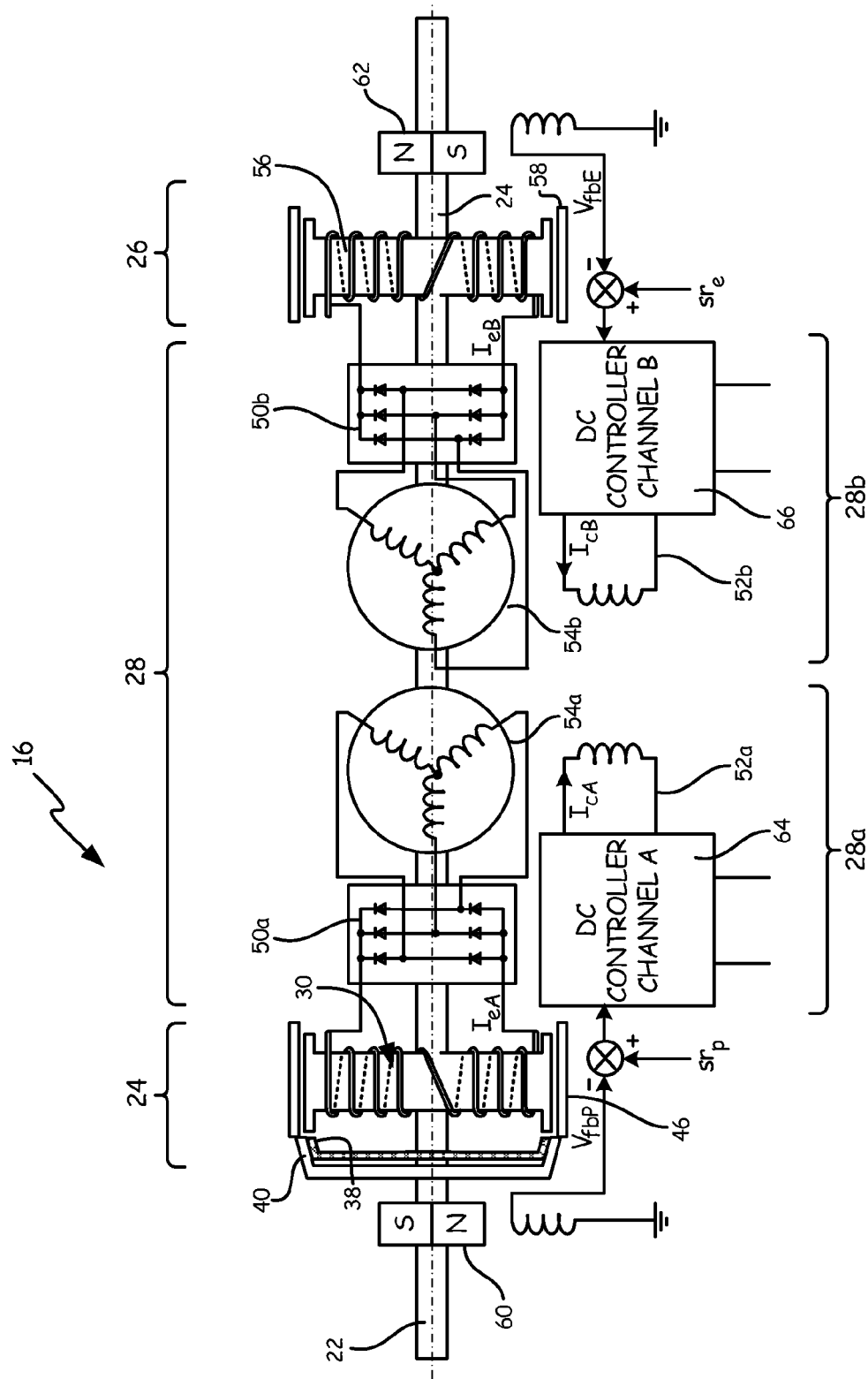
FIG. 2 is a schematic view of the EM device of FIG. 1.

FIG. 2 is a schematic view of EM device 16 in isolation. FIGS. 1 and 2 depict the same embodiment of EM device 16, and illustrate substantially the same elements as described above. As discussed with respect to FIG. 1, field coils 32 of field exciter 30 of integrated ELM clutch and eddy-current coupler 24 can be energized via coupler energizing current $I_{eA}$ from double-channel synchronous exciter 28 to mechanically decouple propeller shaft 22 from engine shaft 20 by magnetically pulling friction clutch cone 38 away from friction clutch cup 40. Energizing field coils 32 simultaneously electromagnetically couples propeller shaft 22 to engine shaft 20 via eddy-current coupling between field exciter 30 and electric circuit 48 on rotating drum 46. The strength of this electromagnetic coupling between propeller shaft 22 and engine shaft 20 depends on coupler energizing current $I_{eA}$. To make up for the engine load lost by mechanically decoupling propeller shaft 22 from engine shaft 20, electromagnetic brake 26 supplies an artificial load on engine shaft 20 proportional to brake energizing current $I_{eB}$.

As illustrated in FIG. 2, double-channel exciter 28 includes first and second channels 28a and 28b. First channel 28a includes first rotating rectifier 50a, first excitation windings 52a, and first rotating armature 54a. Second channel 28b similarly includes second rotating rectifier 50b, second excitation windings 52b, and second rotating armature 54b. First channel 28a feeds ELM clutch and eddy-current coupler 24, while second channel 28b feeds EM brake 26. Each channel is energized by a different control current: first channel 28a by first control current $I_{cA}$, and second channel 28b by second control current $I_{cB}$. Coupler energizing current $I_{eA}$ and brake energizing current $I_{eB}$ depend on first control current $I_{cA}$ and second control current $I_{cB}$, which are produced by first DC controller 64 and second DC controller 66, respectively. Coupler energizing current $I_{eA}$ and brake energizing current $I_{eB}$ are controlled by modulating first control current $I_{cA}$ and second control current $I_{cB}$ based on rotor speeds.

Tachogenerator 60 produces propeller feedback voltage $V_{fbP}$ based on the speed of propeller shaft 22, and tachogenerator 62 produces engine feedback voltage $V_{fbE}$ based on the speed of engine shaft 20. Propeller feedback voltage $V_{fbP}$ is compared with (e.g. subtracted from) propeller speed reference value $sr_P$ to set or produce first control current $I_{cA}$, while engine feedback voltage $V_{fbE}$ is compared with (e.g. subtracted from) engine speed reference value $sr_E$ to set or produce second control current $I_{cB}$. Propeller and engine feedback signals $V_{fbP}$ and $V_{fbE}$ represent target or limiting rotational speeds of propeller shaft 22 and engine shaft 20, respectively. Feedback signals and reference values may be compared digitally or as analog signals (e.g. by analog voltage summing). By conditioning coupler energizing current $I_{eA}$ on propeller feedback voltage $V_{fbP}$, double-channel synchronous exciter 28 regulates propeller rotor speed $v_p$ so that propeller speed $v_p$ remains within acceptable bounds. Similarly, conditioning brake energizing current $I_{eB}$ on engine feedback voltage $V_{fbE}$ allows double-channel synchronous exciter 28 to regulate engine rotor speed $v_e$ to avoid engine overspeed conditions.

Figure 3:
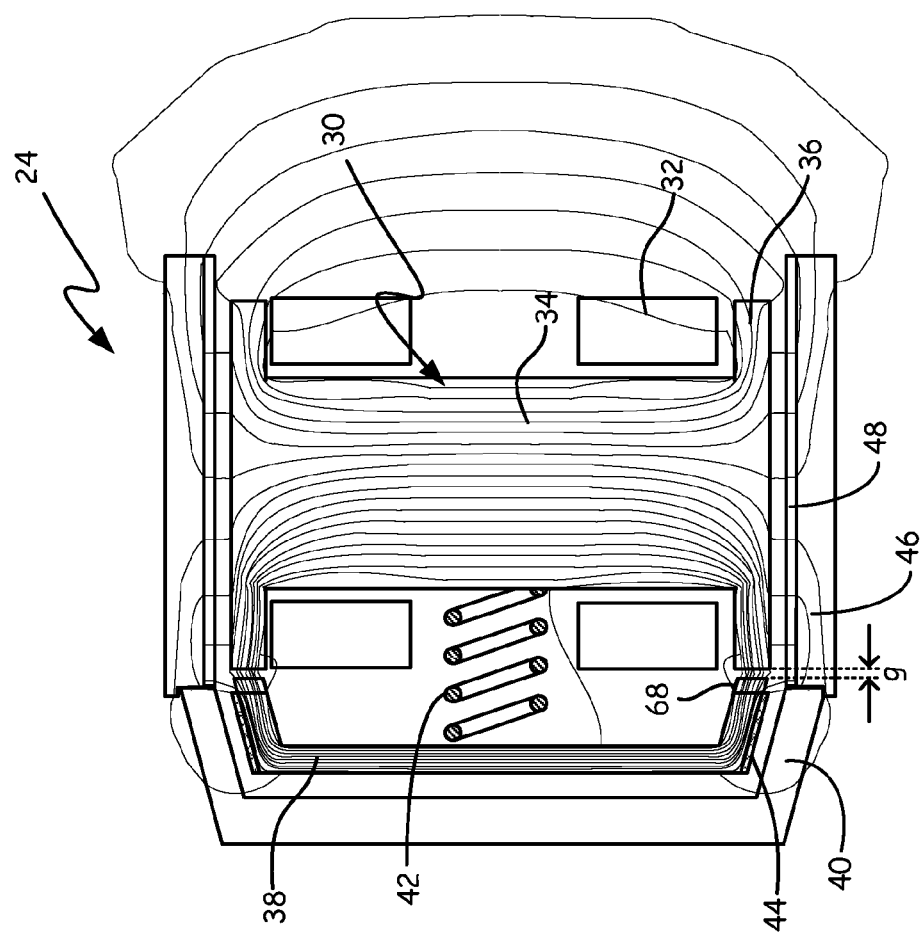
FIG. 3 is a close-up of the simplified cross-sectional view of FIG. 1, illustrating the operation of an electromechanical (ELM) clutch and eddy-current coupler.

FIG. 3 is a close-up simplified cross-sectional view of integrated ELM clutch and eddy-current coupler 24, illustrating field exciter 30, field coils 32, pole cores 34, pole shoes 36, friction clutch cone 38, friction clutch cup 40, spring 42, clutch pad 44, rotating drum 46, electric circuit 48, and gap spacer 68. FIG. 3 further shows field lines indicating magnetic field densities within components of integrated ELM clutch and eddy-current coupler 24. As described above with respect to FIGS. 1 and 2, energizing field coils 32 of field exciter 30 produces a magnetic attraction between pole shoes 36 and friction clutch cup 38 that draws friction clutch cup 38 away from friction cup cone 40 in opposition to spring 42. When clutch pad 44 is separated from friction clutch cup 40, engine shaft 20 and propeller shaft 22 become mechanically decoupled. Energizing field coils 32 simultaneously produces changing magnetic fields through electric circuit 48 and rotating drum 46, as shown via field lines in FIG. 3. These changing magnetic fields induce eddy currents that produce a torque coupling between couple field exciter 30 and rotating drum 46 (and accordingly propeller shaft 22). The strength of this eddy current coupling depends on coupler energizing current $I_{eA}$, as noted previously.

Pole shoes 36 and friction clutch cone 38 are separated by a gap g that varies as a function of coupler energizing current $I_{eA}$. In general, larger values of coupler energizing current $I_{eA}$ will draw friction clutch cone 38 further towards pole shoes 36, reducing the width of gap g. Gap g must be sufficiently wide (e.g. ~0.2 mm or more) to prevent friction clutch cone 38 from locking to pole shoes 36. If gap g falls below this margin, residual magnetization may prevent spring 42 from separating pole shoes 36 from friction clutch cone 38, even after coupler energizing current $I_{eA}$ returns to zero. To preserve gap g between pole shoes 36 and friction clutch cone 38, gap spacer 68 is disposed within gap g. Gap spacer 68 is a non-ferromagnetic spacing element that may, for instance, be secured to either pole shoes 36 or friction clutch cup 38. Gap spacer 68 may, for example, be formed of plastic, aluminum, or brass.

EM device 16 configurably transfers torque from engine shaft 20 to propeller shaft 22, allowing propeller speeds to be maintained and/or controlled during transient unloading conditions, e.g. during landing maneuvers. EM device 16 artificially loads engine shaft 20 to prevent damage from engine overspeeds, while allowing engine 12 to be operated at full power (i.e. without spooling down engine 12) during transient unloading conditions. These improvements allow for safer and more reliable operation of turboprop vehicles.

The following are non-exclusive descriptions of possible embodiments of the present invention.

An electromagnetic device for overspeed control of a propeller driven by an engine shaft, the electromechanical device comprising: a clutch disposed to mechanically decouple the propeller from the engine shaft; an eddy-current coupler disposed to electromagnetically couple the propeller to the engine shaft when the clutch mechanically decouples the propeller from the engine shaft; and an electromagnetic brake disposed to artificially load the engine shaft when propeller load on the engine shaft is reduced by mechanically decoupling the propeller from the engine shaft.

The electromagnetic device of the preceding paragraph can optionally include, additionally and/or alternatively, any one or more of the following features, configurations, and/or additional components:

wherein the clutch is an electromechanical clutch.

wherein the electromechanical clutch and the eddy-current coupling are integrated in a rotating electromagnetic assembly comprising: a field coil configured to receive a first energizing current; a pole shoe energized by the first energizing current to electromagnetically decouple a ferromagnetic friction clutch cone attached to the engine shaft from a friction clutch cup attached to the propeller; and a rotating drum attached to the friction clutch cup and coupled via eddy currents to the pole shoe with a coupling strength determined by strength of the first energizing current.

wherein the energizing current is set based on speed of the propeller compared to a speed reference.

wherein the electromagnetic brake is driven by a second energizing current, such that the artificial load is determined by strength of the second energizing current.

wherein the second energizing current is set based on speed of the engine shaft.

and further comprising a double-channel synchronous exciter with a first channel providing the first energizing current, and a second channel providing the second energizing current.

A method of controlling speed of a propeller on an engine shaft, the method comprising: mechanically decoupling the propeller from the engine shaft with an electromagnetic clutch in response to a potential overspeed event; electromagnetically coupling the propeller to the engine shaft with an eddy current coupler when the propeller is mechanically decoupled from the engine shaft; and artificially loading the engine shaft with an electromagnetic brake when the propeller is mechanically decoupled from the engine shaft.

The method of the preceding paragraph can optionally include, additionally and/or alternatively, any one or more of the following features, configurations, and/or additional components:

wherein mechanically decoupling the propeller from the engine shaft comprises energizing a pole shoe attached to the engine shaft with a first energizing current to separate a friction clutch cone attached to the engine shaft from a friction clutch cup attached to the propeller.

wherein electromagnetically coupling the propeller to the engine shaft comprises inducing eddy currents in a rotating drum attached to the friction clutch cup via the energized pole shoe.

wherein slip of the electromagnetic coupling is determined by the first energizing current, and is greater than slip of the mechanical coupling.

wherein strength of the artificial loading is determined by a second energizing current.

wherein the first energizing current is set based on speed of the propeller compared with a first speed reference, and the second energizing current is set based on speed of the engine shaft.

wherein the first energizing current is provided by a first channel of a double-channel synchronous exciter, and the second energizing current is provided by a second channel of the double-channel synchronous exciter.

A propeller system comprising: a propeller on a propeller shaft; an engine disposed to drive the propeller shaft via an engine shaft; a clutch disposed to mechanically decouple the propeller shaft from the engine shaft; an eddy-current coupler disposed to electromagnetically couple the propeller shaft to the engine shaft when the clutch mechanically decouples the propeller from the engine shaft; and an electromagnetic brake disposed to artificially load the engine shaft when propeller load on the engine shaft is reduced by mechanically decoupling the propeller from the engine shaft.

The propeller system of the preceding paragraph can optionally include, additionally and/or alternatively, any one or more of the following features, configurations, and/or additional components:

wherein the propeller is a propulsion propeller of a turboprop vehicle.

wherein the propeller has pitchable blades.

wherein the clutch and the eddy-current coupling are integrated in a rotating electromagnetic assembly comprising: a field coil configured to receive a first energizing current; a pole shoe energized by the first energizing current to electromagnetically decouple a ferromagnetic friction clutch cone attached to the engine shaft from a friction clutch cup attached to the propeller; and a rotating drum attached to the friction clutch cup and coupled via eddy currents to the pole shoe with a coupling strength determined by strength of the first energizing current.

wherein the energizing current is set based on speed of the propeller compared to a speed reference.

wherein the electromagnetic brake is driven by a second energizing current set based on the speed of the engine shaft, such that the artificial load is determined by strength of the second energizing current.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electromagnetic device for overspeed control of a propeller driven by an engine shaft, the electromagnetic device comprising:

an electromechanical clutch disposed to mechanically decouple the propeller from the engine shaft;

an eddy-current coupler disposed to electromagnetically couple the propeller to the engine shaft when the clutch mechanically decouples the propeller from the engine shaft; and an electromagnetic brake disposed to impose an artificial load on the engine shaft when a propeller load on the engine shaft is reduced by mechanically decoupling the propeller from the engine shaft;

wherein the electromechanical clutch and the eddy-current coupler are integrated in a rotating electromagnetic assembly comprising:

a field coil configured to receive a first energizing current;

a pole shoe energized by the first energizing current to electromagnetically decouple a ferromagnetic friction clutch cone attached to the engine shaft from a friction clutch cup attached to the propeller; and a rotating drum attached to the friction clutch cup and coupled via eddy currents to the pole shoe with a coupling strength determined by a magnitude of the first energizing current.

2. The electromagnetic device of claim 1, wherein the first energizing current is set based on a speed of the propeller compared to a speed reference.

3. The electromagnetic device of claim 1, wherein the electromagnetic brake is driven by a second energizing current, such that the artificial load is determined by a magnitude of the second energizing current.

4. The electromagnetic device of claim 3, wherein the second energizing current is set based on a speed of the engine shaft.

5. The electromagnetic device of claim 3, further comprising a double-channel synchronous exciter with a first channel providing the first energizing current, and a second channel providing the second energizing current.

6. A method of controlling speed of a propeller on an engine shaft, the method comprising:

disengaging a mechanical coupling between the propeller and the engine shaft with an electromagnetic clutch in response to a potential overspeed event, by energizing a pole shoe attached to the engine shaft with a first energizing current to separate a friction clutch cone attached to the engine shaft from a friction clutch cup attached to the propeller;

engaging an electromagnetic coupling between the propeller and the engine shaft with an eddy current coupler when the propeller is mechanically decoupled from the engine shaft; and imposing an artificial load on the engine shaft with an electromagnetic brake when the propeller is mechanically decoupled from the engine shaft.

7. The method of claim 6, wherein engaging an electromagnetic coupling between the propeller and the engine shaft comprises inducing eddy currents in a rotating drum attached to the friction clutch cup via the energized pole shoe.

8. The method of claim 6, wherein slip of the electromagnetic coupling is determined by the first energizing current, and is greater than slip of the mechanical coupling.

9. The method of claim 8, wherein strength of the artificial load is determined by a second energizing current.

10. The method of claim 9, wherein the first energizing current is set based on a speed of the propeller compared with a first speed reference, and the second energizing current is set based on speed of the engine shaft.

11. The method of claim 9, wherein the first energizing current is provided by a first channel of a double-channel synchronous exciter, and the second energizing current is provided by a second channel of the double-channel synchronous exciter.

12. A propeller system comprising:
a propeller on a propeller shaft;
an engine disposed to drive the propeller shaft via an engine shaft;
a clutch disposed to mechanically decouple the propeller shaft from the engine shaft;
an eddy-current coupler disposed to electromagnetically couple the propeller shaft to the engine shaft when the clutch mechanically decouples the propeller from the engine shaft; and
an electromagnetic brake disposed to impose an artificial load on the engine shaft when propeller load on the engine shaft is reduced by mechanically decoupling the propeller from the engine shaft;
wherein the clutch and the eddy-current coupler are integrated in a rotating electromagnetic assembly comprising:
a field coil configured to receive a first energizing current;
a pole shoe energized by the first energizing current to electromagnetically decouple a ferromagnetic friction clutch cone attached to the engine shaft from a friction clutch cup attached to the propeller; and
a rotating drum attached to the friction clutch cup and coupled via eddy currents to the pole shoe with a coupling strength determined by a magnitude of the first energizing current.

13. The propeller system of claim 12, wherein the propeller is a propulsion propeller of a turboprop vehicle.

14. The propeller system of claim 12, wherein the propeller has pitchable blades.

15. The propeller system of claim 12, wherein the energizing current is set based on a speed of the propeller compared to a speed reference.

16. The propeller system of claim 12, wherein the electromagnetic brake is driven by a second energizing current set based on a speed of the engine shaft, such that the artificial load is determined by a strength of the second energizing current.

17. The propeller system of claim 12, wherein a gap spacer is disposed between the pole shoe and the clutch to preserve a gap between the pole shoe and the friction clutch cup when the pole shoe is energized.

* * * * *